May 12, 1931.  J. A. ROBBINS  1,805,343

INSTRUMENT FOR DETECTING IRREGULARITIES IN THE BORES OF PIPES AND THE LIKE

Filed Nov. 22, 1929

John A. Robbins
INVENTOR

BY Victor J. Evans
ATTORNEY

Patented May 12, 1931

1,805,343

UNITED STATES PATENT OFFICE

JOHN A. ROBBINS, OF LAWRENCEVILLE, ILLINOIS

INSTRUMENT FOR DETECTING IRREGULARITIES IN THE BORES OF PIPES AND THE LIKE

Application filed November 22, 1929. Serial No. 409,155.

This invention relates to an instrument for use in determining whether there are any imperfections or irregularities in or on the inner surfaces of the walls of the pipes or tubes, and one of the objects of the invention is to provide an instrument for this purpose by the use of which the point of location of the defective place may be readily determined.

Another object of the invention is to provide an instrument for the purpose stated which will be extremely simple in its construction and easy to manufacture and which will not be liable to any disarrangement of its component parts.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
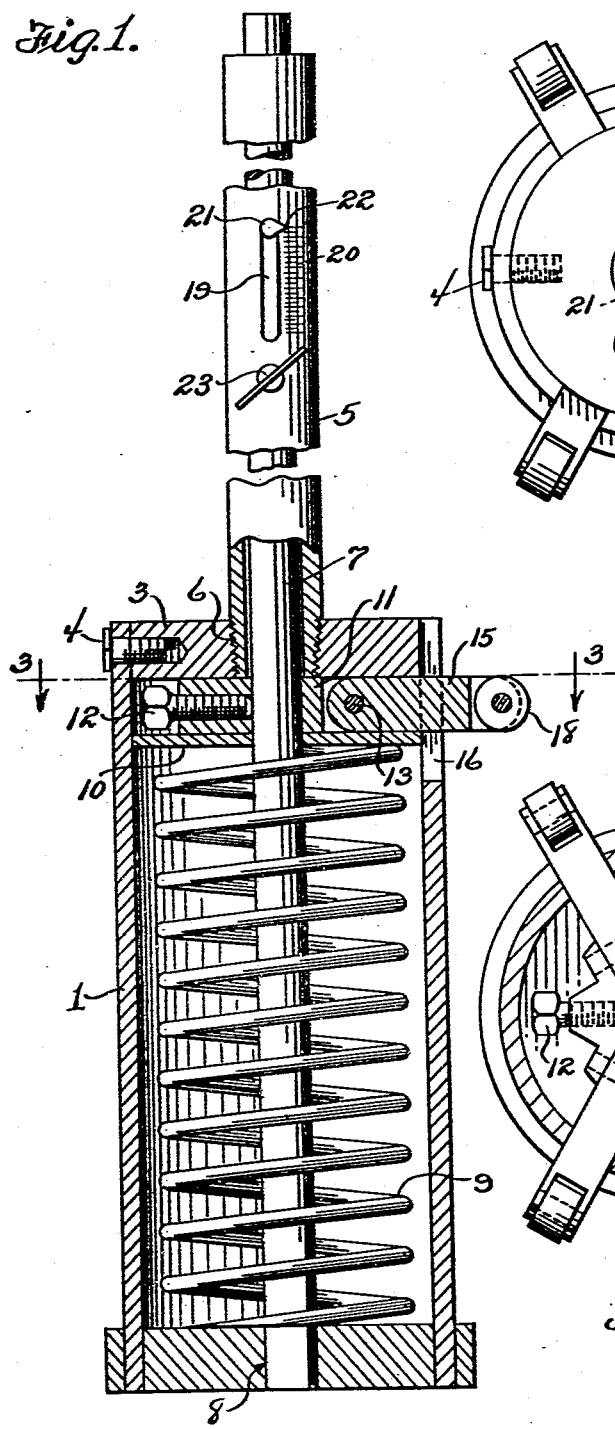
Figure 1 is a view partly in vertical section and partly in elevation illustrating the instrument embodying the invention.
Figure 2:
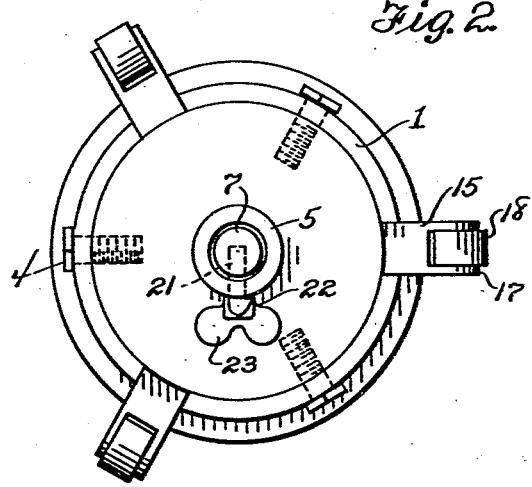
Figure 2 is a top plan view of the instrument.
Figure 3:
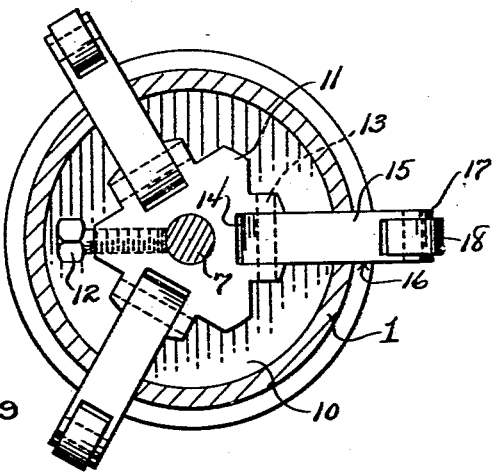
Figure 3 is a horizontal sectional view on the line 3—3 of Figure 1 looking in the direction indicated by the arrows.

The instrument comprises a cylinder which is indicated by the numeral 1 and is closed at its lower end by a head 2 which may be permanently or removably secured in place, and the cylinder is closed at its upper end by a similar head indicated by the numeral 3 which is preferably held in place by screws 4 which are fitted through openings in the upper end of the cylinder and into threaded sockets in the head. The numeral 5 indicates a tube which is threaded or otherwise secured at its lower end, as indicated by the numeral 6 in an opening formed axially in the head 3, and a stem, indicated by the numeral 7 and of cylindrical form, is mounted in the tube 5 for sliding movement longitudinally therein and engages at its lower end in an opening 8 formed axially through the head 2. A compression spring 9 is arranged within the casing 1 and bears at its lower end against the upper side of the head 2 and at its upper end against the under side of a disk 10, which is provided axially with an opening adapting it for sliding movement upon the stem 7.

The casing 1 will be made of a diameter somewhat less than the interior diameter of any pipe or tube which is to be tested by the use of the device so as to be adapted to be readily fitted into the same. The numeral 11 indicates a spider which is fitted to the stem 7 and preferably of approximately triangular form and this spider is held at various positions of adjustment upon the stem by means of a set screw 12.

As shown in Figure 1 of the drawings, the spider 11 is fixed upon the stem 7 in such position that the disk 10 will bear against the under side of the spider and hold the upper side of the spider against the underside of the head 3 of the cylinder. The spider is formed at each of its sides with a pair of ears 13 and pivoted between the ears of each pair is the rounded inner end 14 of an arm 15, these arms radiating from the axis of the stem due to the triangular form of the spider 11. The casing wall is formed with an equivalent number of vertically extending slots at its upper end, which slots are indicated by the numeral 16 and through which slots the outer portions of the arms project, the outer end of each arm being recessed to provide a pair of spaced ears 17. Freely rotatable rollers 18 are mounted between these ears and these rollers are designed for contact with the inner surface of the tube or pipe to be tested for irregularities.

At this point it will be understood that when the instrument is inserted into the tube or pipe to be tested and slowly lowered within the pipe or tube, the rollers 18 will ride over the inner surface of the wall of the said pipe or tube and if there should be any projecting or protruding parts at the inner surface of the said wall of the pipe and the roller at the outer end of any of the arms should strike the same, this end of the arm will of course be swung upwardly, and that portion of the periphery of the head 3 of the cylinder which has the slot 15 in the cylinder wall will then constitute a fulcrum for the arm, and as the arm is pivotally connected with the spider 11 and as the spider engages the disk 10, the said disk will be moved downwardly against the tension of the spring 9 and will carry with it the stem 7.

In order that such movement of the stem may be taken advantage of in determining the moment at which any of the rollers engages any irregularities in the inner surface of the tube or pipe, and the extent of displacement of the respective arm 15, which will of course depend upon the size of the irregularity or extent to which it projects into the tube or pipe, the tube 5 is formed with a vertically extending slot in one side, indicated by the numeral 19, and, at one side of this slot the tube is provided upon its outer side with a scale, indicated by the numeral 20, and a stud 21 projects from the side of the stem and through the slot and has a pointer 22, at its outer end which is presented to the scale 20. As thus far described, the instrument is adapted to, as stated, indicate the moment at which any one of the rollers engages an irregularity in the surface of the pipe or tube, and in order that the stem 7 may at this moment be held stationary so that the instrument may be drawn from the tube or pipe and estimates made as to the nature of the imperfection therein, a wing screw 23 is threaded through the side of the tube 5 preferably below the lower end of the slot 19 and is adapted to be adjusted so as to bind against the said stem 7 and prevent any further displacement of the stem, it being understood, at this point, that when the user of the instrument has completed his examination of the scale registration, the parts may be restored to their normal positions by a mere loosening of the wing screw 23, the spring 9 serving to shift the disk 10 upwardly until the under sides of the arms 15 are engaged by the disk and the upper sides of said arms engage against the under side of the head 3 of the casing 1, the arms being for this purpose, as illustrated in Figure 1, of a thickness equal to the thickness of the spider 11 in which the recesses, to form the ears 13, are formed.

What I claim is:—

1. In an instrument for testing tubes and pipes for irregularities in the bores thereof, a cylinder, a tube extending from the cylinder and having a longitudinal slot therein and provided, at one side of the slot, with scale marks, a stem slidable in the said tube and having a pointer thereon for registration with the scale marks, a spider adjustably mounted upon the stem and slidable within the cylinder, the cylinder being closed at its end through which the stem extends, the spider being engageable against the inner side of the closed end, means within the cylinder yieldably holding the spider in such engagement, arms radiating from the spider and pivotally connected therewith, the cylinder having longitudinally extending slots therein and the said arms extending through said slots, and anti-friction elements carried at the outer ends of the arms for contact with the inner surface of the wall of the tube or pipe to be tested, whereby when the anti-friction element of any of the arms engages an irregularity in the surface of the tube or pipe to be tested, the arm will be displaced and the movement of the stem in the tube thus effected will, in turn, effect the registration of the pointer with the scale.

2. In an instrument for testing tubes and pipes for irregularities in the bores thereof, a cylinder, a tube extending from the cylinder and having a longitudinal slot therein and provided, at one side of the slot, with scal marks, a stem slidable in the said tube and having a pointer thereon for registration with the scale marks, a spider adjustably mounted upon the stem and slidable in the cylinder, the cylinder being closed at its end through which the stem extends, the spider being engageable against the inner side of the closed end, means within the cylinder yieldably holding the spider in such engagement, arms radiating from the spider and pivotally connected therewith, the cylinder having longitudinally extending slots therein and the said arms extending through said slots, anti-friction elements carried at the outer ends of the arms for contact with the inner surface of the wall of the tube or pipe to be tested, whereby when the anti-friction element of any of the arms engages an irregularity in the surface of the tube or pipe to be tested, the arm will be displaced and movement of the stem in the tube thus effected will in turn effect the registration of the pointer with the scale, and a set screw carried by the tube and adjustable to engage the said stem to hold the stem in the position which it assumes when displaced.

In testimony whereof I affix my signature.

JOHN A. ROBBINS.